(12) United States Patent
Yoshizawa et al.

(10) Patent No.: US 12,278,340 B2
(45) Date of Patent: Apr. 15, 2025

(54) ALL-SOLID-STATE BATTERY AND METHOD OF PRODUCING ALL-SOLID-STATE BATTERY

(71) Applicant: HONDA MOTOR CO., LTD., Tokyo (JP)

(72) Inventors: Akihiro Yoshizawa, Wako (JP); Ushio Harada, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 454 days.

(21) Appl. No.: 17/666,595

(22) Filed: Feb. 8, 2022

(65) Prior Publication Data

US 2022/0302504 A1    Sep. 22, 2022

(30) Foreign Application Priority Data

Mar. 19, 2021    (JP) .................................. 2021-046042

(51) Int. Cl.
*H01M 10/0585*    (2010.01)
*H01M 4/02*    (2006.01)
(Continued)

(52) U.S. Cl.
CPC ... *H01M 10/0585* (2013.01); *H01M 10/0525* (2013.01); *H01M 10/0562* (2013.01); *H01M 2004/021* (2013.01)

(58) Field of Classification Search
CPC ......... H01M 10/0585; H01M 10/0525; H01M 2004/021; H01M 10/0562
See application file for complete search history.

(56) References Cited

U.S. PATENT DOCUMENTS

2012/0177998 A1    7/2012    Ogawa et al.
2015/0188195 A1    7/2015    Matsushita
(Continued)

FOREIGN PATENT DOCUMENTS

CN    102576909    7/2012
CN    104752774    7/2015
(Continued)

OTHER PUBLICATIONS

Machine Translation of WO-2013175993-A1 (Sep. 3, 20204) (Year: 2024).*

(Continued)

*Primary Examiner* — Matthew J Merkling
(74) *Attorney, Agent, or Firm* — Amin, Turocy & Watson, LLP

(57) ABSTRACT

An all-solid-state battery (1) includes a positive electrode (20) in which a first current collector layer (21) and a first active material layer (22) containing at least a solid electrolyte are laminated, a negative electrode (30) in which a second current collector layer (31) and a second active material layer (32) containing at least a solid electrolyte are laminated, and a first solid electrolyte layer (41) disposed between the first active material layer (22) and the second active material layer 32. In a direction perpendicular to a lamination direction, an area of the second active material layer (32) in the negative electrode (30) is larger than an area of the first active material layer (22) in the positive electrode (20), and in a direction perpendicular to the lamination direction, an area of the first solid electrolyte layer (41) is larger than an area of the first active material layer (22) in the positive electrode (20), and the porosity $n1_{am}$ of the first active material layer (22) is 5% or less.

16 Claims, 9 Drawing Sheets

(51) Int. Cl.
H01M 10/0525 (2010.01)
H01M 10/0562 (2010.01)

(56) References Cited

U.S. PATENT DOCUMENTS

| | | |
|---|---|---|
| 2016/0380301 A1 | 12/2016 | Kosaka et al. |
| 2018/0294531 A1 | 10/2018 | Haga et al. |
| 2020/0036044 A1 | 1/2020 | Waseda |
| 2020/0373565 A1 | 11/2020 | Yawata et al. |

FOREIGN PATENT DOCUMENTS

| | | | | |
|---|---|---|---|---|
| CN | 106299443 | | 1/2017 | |
| CN | 106328992 A | * | 1/2017 | ........ H01M 10/0525 |
| CN | 108695538 | | 10/2018 | |
| CN | 110783635 | | 2/2020 | |
| JP | 5354646 | | 11/2013 | |
| JP | 2014-120199 | | 6/2014 | |
| JP | 2014-216131 | | 11/2014 | |
| JP | 2015-008073 | | 1/2015 | |
| JP | 2015008073 A | * | 1/2015 | |
| JP | 2015-118870 | | 6/2015 | |
| JP | 2015-162353 | | 9/2015 | |
| JP | 2016100069 A | * | 5/2016 | ............ H01M 10/04 |
| JP | 2017-010816 | | 1/2017 | |
| JP | 2018-147621 | | 9/2018 | |
| JP | 2020-021551 | | 2/2020 | |
| WO | WO-2013175993 A1 | * | 11/2013 | .......... H01M 10/052 |
| WO | 2019/188487 | | 10/2019 | |

OTHER PUBLICATIONS

Machine Translation of JP-2015008073-A (Sep. 3, 2024) (Year: 2024).*
Machine Translation of JP-2016100069-A (Sep. 3, 2024) (Year: 2024).*
Machine Translation of CN106328992A (Sep. 3, 2024) (Year: 2024).*
Chinese Office Action for Chinese Patent Application No. 202210090004.8 mailed Mar. 29, 2024.
Japanese Office Action for Japanese Patent Application No. 2021-046042 dated Dec. 3, 2024.
Chinese Office Action for Chinese Patent Application No. 202210090004.8 dated Feb. 21, 2025.
Co-edited by Nanjing Institute of Chemicals et al., "Ceramic Processes", China Architecture & Building Press, p. 106, Jul. 31, 1981.

* cited by examiner

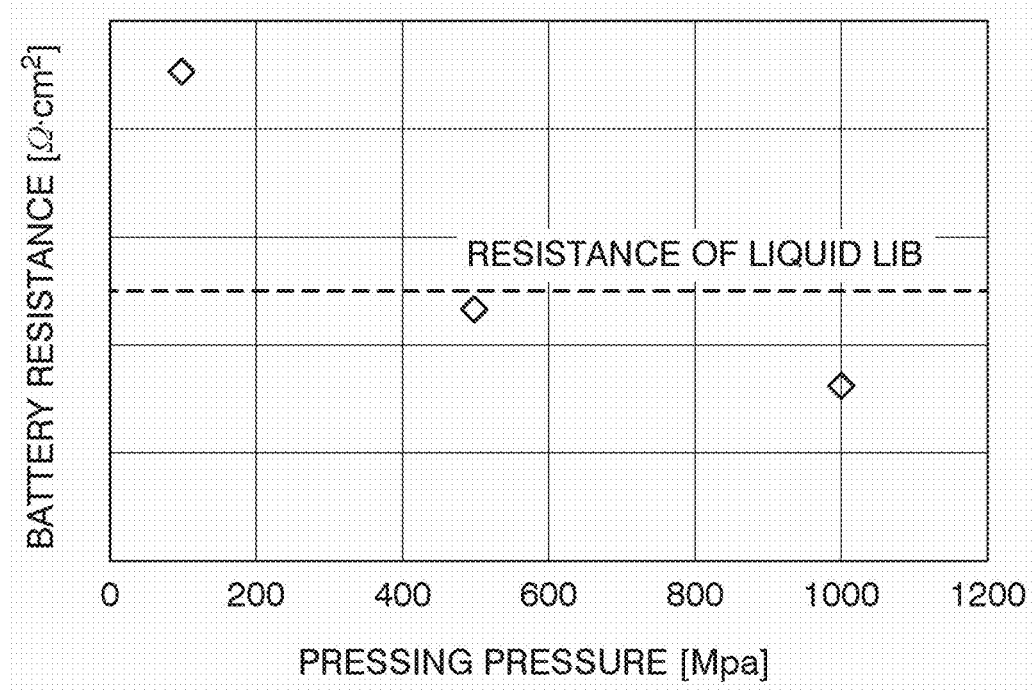

FIG. 8
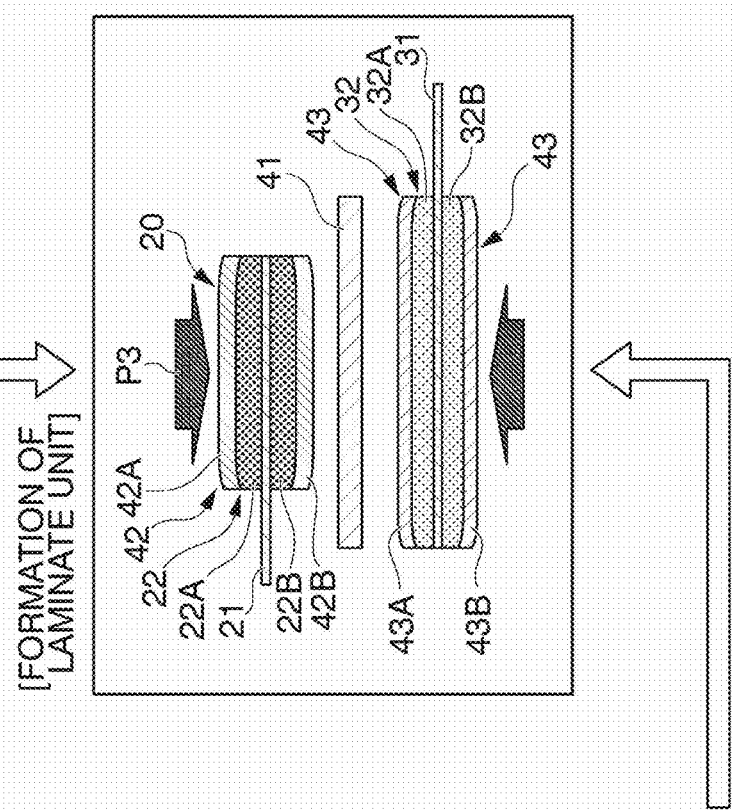
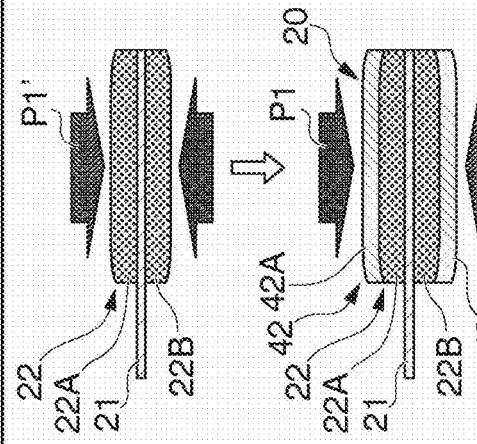
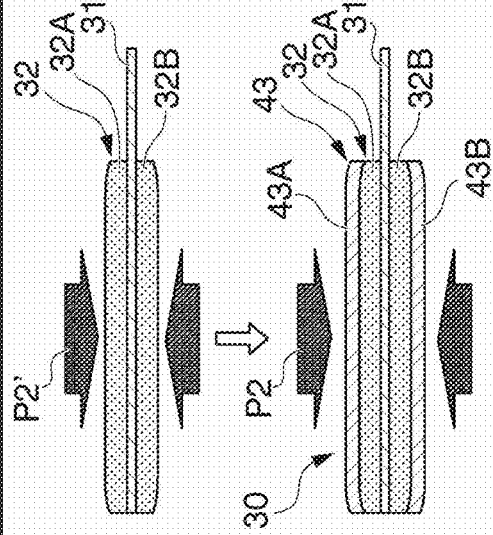

ALL-SOLID-STATE BATTERY AND METHOD OF PRODUCING ALL-SOLID-STATE BATTERY

CROSS-REFERENCE TO RELATED APPLICATION

Priority is claimed on Japanese Patent Application No. 2021-046042, filed Mar. 19, 2021, the content of which is incorporated herein by reference.

FIELD OF THE INVENTION

The present disclosure relates to an all-solid-state battery and a method of producing an all-solid-state battery.

DESCRIPTION OF RELATED ART

In order to secure and maintain the performance of that at the time of design, when a laminate formed by laminating a positive electrode, a solid electrolyte layer and a negative electrode is formed, it is necessary to press-mold at a high surface pressure, have a high bonding strength, and maintain the subsequent bonding state of an all-solid-state battery. Regarding such a production method, for example, a production method in which a sheet having a solid electrolyte disposed on an upper surface of an electrode mixture of a sheet coated with an electrode mixture on both surfaces of a current collector foil is cut out into an arbitrary shape and in which a positive electrode and a negative electrode are alternately laminated and press-molded has been proposed (Patent Document 1).

On the other hand, as seen in a conventional lithium ion battery (liquid LIB), when a battery having a laminate structure in which punched electrodes are laminated is formed, generally, in order to avoid a risk of lithium electrodeposition that may occur due to positional displacement of the electrodes, the electrodes are laminated so that the area of the negative electrode is larger than the area of the positive electrode (Patent Document 2).

PATENT DOCUMENTS

[Patent Document 1] Japanese Unexamined Patent Application, First Publication No. 2015-118870
[Patent Document 2] Japanese Patent No. 5354646

SUMMARY OF THE INVENTION

In order to produce a sulfur-based all-solid-state battery, since it is important to apply compression energy from the outside and form a favorable interface between particles, an electrolyte is densified by a pressing process or the like to strengthen the connection with an electrode active material and a conductive aid. For example, when a positive electrode, a solid electrolyte layer and a negative electrode are laminated, and batch-pressed with a uniaxial press or a roll press, the solid electrolyte in the electrode and the solid electrolyte in the solid electrolyte layer are densified, interface formation between particles containing an electrode active material and a conductive aid is constructed and bonds between each electrode/solid electrolyte layer are formed at the same time.

In order to improve the energy/power density of an all-solid-state battery, it is necessary to make the solid electrolyte layer thin. However, when batch pressing is applied to such a structure, since the areas of the positive electrode and the negative electrode are basically different, the pressing pressure in the plane varies, parts in which densification is promoted and parts in which deformation is promoted without densification are formed, and as a result, structural failure may occur due to stress concentration. In addition, during the pressing process, the thin solid electrolyte layer easily breaks, and the positive electrode and the negative electrode may come into contact with each other causing short circuiting, which makes it impossible to form a battery.

In addition, when a positive electrode and a negative electrode with different areas are batch-pressed, an unpressed part may occur at an end of the negative electrode with a large area, and interface formation between particles may be insufficient. As a result, during charging, the end of the negative electrode with high resistance cannot receive lithium from the positive electrode, and lithium concentrates in the center of the negative electrode with low resistance, which eventually causes lithium electrodeposition and causes internal short circuiting (slight short circuiting).

In addition, in order to increase the size and capacity of a single cell in an all-solid-state battery, a laminated all-solid-state battery using double-side-coated electrodes is desirable as in the case of a liquid lithium ion battery. However, in a pressing method other than that of the high-cost isostatic pressing principle (CIP/WIP), compression energy is applied in the lamination direction, and a pressing force in the lamination direction changes to a thrust in the lateral direction, which is likely to be applied to unrestrained sides. As a result, densification of the electrode active material layer and the solid electrolyte layer becomes insufficient, which causes an increase in battery resistance and lithium electrodeposition due to the resistance distribution, that is, internal short circuiting, and it is not possible to increase the size and capacity of a single cell.

The present disclosure provides an all-solid-state battery and a method of producing an all-solid-state battery through which it is possible to increase the size and capacity of a battery at low cost.

In order to achieve the above object, the present disclosure provides the following aspects.

As a first aspect, an all-solid-state battery is provided including a positive electrode in which a first current collector layer and a first active material layer containing at least a solid electrolyte are laminated; a negative electrode in which a second current collector layer and a second active material layer containing at least a solid electrolyte are laminated; and a first solid electrolyte layer disposed between the first active material layer and the second active material layer, wherein, in a direction perpendicular to a lamination direction, an area of the second active material layer in the negative electrode is larger than an area of the first active material layer in the positive electrode, wherein, in a direction perpendicular to the lamination direction, an area of the first solid electrolyte layer is larger than an area of the first active material layer in the positive electrode, and wherein a porosity $n1_{am}$ of the first active material layer is 5% or less.

In the first aspect, the all-solid-state battery further includes a second solid electrolyte layer positioned between the first active material layer and the first solid electrolyte layer, wherein a porosity $n2_{se}$ of the second solid electrolyte layer is smaller than the porosity $n1_{se}$ of the first solid electrolyte layer.

In the first aspect, the porosity $n1_{se}$ of the first solid electrolyte layer is 30% or less.

In the first aspect, the porosity $n1_{se}$ of the first solid electrolyte layer, the porosity $n1_{am}$ of the first active material layer and the porosity $n2_{se}$ of the second solid electrolyte layer satisfy the relationship of $n1_{se} > n1_{am} \geq n2_{se}$.

In the first aspect, the thickness of the second solid electrolyte layer is 7 μm or less, and the thickness of the first solid electrolyte layer is 5 μm or more and 15 μm or less.

In the first aspect, the porosity $n2_{am}$ of the second active material layer is 10% or less.

In the first aspect, the all-solid-state battery further includes a third solid electrolyte layer positioned between the second active material layer and the first solid electrolyte layer, and the porosity $n3_{se}$ of the third solid electrolyte layer is smaller than the porosity $n1_{se}$ of the first solid electrolyte layer.

In the first aspect, wherein the porosity $n3_{se}$ of the third solid electrolyte layer is 10% or less.

In the first aspect, the porosity $n1_{se}$ of the first solid electrolyte layer, the porosity $n2_{am}$ of the second active material layer, and the porosity $n3_{se}$ of the third solid electrolyte layer satisfy the relationship of $n1_{se} > n2_{am} \geq n3_{se}$.

In the first aspect, the thickness of the third solid electrolyte layer is 7 μm or less, and the thickness of the first solid electrolyte layer is 5 μm or more and 15 μm or less.

As a second aspect, a method of producing an all-solid-state battery is provided including a process in which pressurizing is performed when a first current collector layer and a first active material layer containing at least a solid electrolyte are laminated, and a positive electrode is formed, a process in which pressurizing is performed when a second current collector layer and a second active material layer which contains at least a solid electrolyte and has an area larger than an area of the first active material layer in a direction perpendicular to a lamination direction are laminated, and a negative electrode is formed, and a process in which pressurizing is performed when the positive electrode, a first solid electrolyte layer having a larger area than the first active material layer in a direction perpendicular to the lamination direction, and the negative electrode are laminated in that order, and a laminate unit is formed.

In the second aspect, a pressure P3 in the process of forming the laminate unit is lower than either a pressure P1 in the process of forming the positive electrode or a pressure P2 in the process of forming the negative electrode.

In the second aspect, the pressure P1 in the process of forming the positive electrode is 98 MPa or more and 980 MPa or less; and the pressure P3 in the process of forming the laminate unit is 0.1 MPa or more and 10 MPa or less.

In the second aspect, in the process of forming the positive electrode, pressurizing is performed when a second solid electrolyte layer is additionally laminated on the first active material layer, and in the process of forming the laminate unit, the second solid electrolyte layer and the first solid electrolyte layer are bonded.

In the second aspect, in the process of forming the negative electrode, pressurizing is performed when a third solid electrolyte layer is additionally laminated on the second active material layer, and in the process of forming the laminate unit, the third solid electrolyte layer and the first solid electrolyte layer are bonded.

In the second aspect, in the process of forming the negative electrode, the pressure P2 is 98 MPa or more and 980 MPa or less.

In the second aspect, in the process of forming the laminate unit, the unpressurized first solid electrolyte layer is disposed between the positive electrode and the negative electrode and pressurized.

In the second aspect, in the process of forming the laminate unit, the laminate unit is pressurized while heating.

In the second aspect, in the process of forming the laminate unit, a heating temperature is 80° C. or higher and 200° C. or lower.

According to the present disclosure, it is possible to increase the size and capacity of the battery at low cost.

BRIEF DESCRIPTION OF THE DRAWINGS

FIG. 2 is a graph showing resistance of a liquid lithium ion battery in a comparison of a correlation between a press load and resistance.

FIG. 8 is a schematic view for illustrating a modified example of an electrode forming process in the method of producing an all-solid-state battery in FIG. 7.

DETAILED DESCRIPTION OF THE INVENTION

Hereinafter, embodiments of the present disclosure will be described in detail with reference to the drawings.

[Configuration of all-Solid-State Battery]

Figure 1:
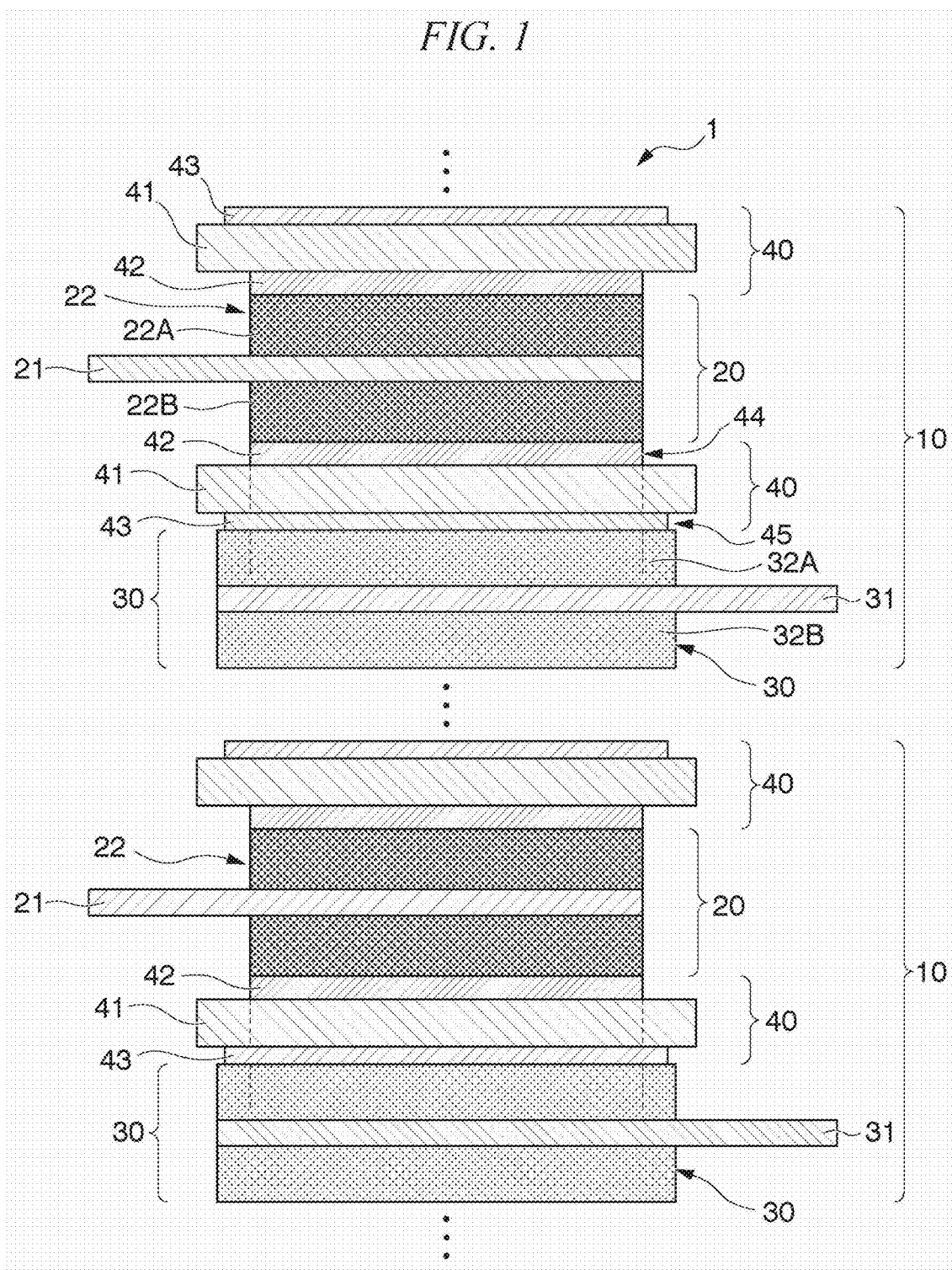
FIG. 1 is a cross-sectional view showing an example of a structure of a laminate unit constituting an all-solid-state battery according to an embodiment of the present disclosure.

FIG. 1 is a cross-sectional view showing an example structure of a laminate unit (single cell) constituting an all-solid-state battery according to an embodiment of the present disclosure. Here, in the drawings used in the following description, in order to facilitate understanding, features are enlarged for convenience of illustration in some cases, and dimensional ratios of components and the like are not limited to those shown in the drawings.

A laminate unit 10 includes a positive electrode 20, a negative electrode 30, and a solid electrolyte layer 40 which is disposed between the positive electrode 20 and the negative electrode 30 and contains a solid electrolyte. An all-solid-state battery 1 includes a plurality of laminate units 10, 10, . . . which are laminated. The positive electrode 20 and the negative electrode 30 are alternately laminated with the solid electrolyte layer 40 therebetween. The all-solidstate battery is charged and discharged according to transfer of lithium ions between the positive electrode 20 and the negative electrode 30 with the solid electrolyte layer 40 therebetween.

(Positive Electrode)

In the positive electrode 20, a first current collector layer 21 and a first active material layer 22 containing at least a solid electrolyte are laminated. In the present embodiment, the positive electrode 20 includes the first current collector layer 21 and positive electrode active material layers 22A and 22B which are formed on both main surfaces of the first current collector layer 21 and contain a positive electrode active material and a solid electrolyte.

The first current collector layer 21 is preferably composed of at least one substance having high conductivity. Examples of highly conductive substances include metals or alloys containing at least one metal element of silver (Ag), palladium (Pd), gold (Au), platinum (Pt), aluminum (Al), copper (Cu), chromium (Cr), and nickel (Ni), and non-metals such as carbon (C). In consideration of production cost in addition to high conductivity, aluminum, nickel or stainless steel is preferable. In addition, aluminum does not easily react with the positive electrode active material, the negative electrode active material and the solid electrolyte. Therefore, if aluminum is used for the first current collector layer 21, it is possible to reduce the internal resistance of the all-solid-state battery.

Examples of the shape of the first current collector layer 21 include a foil shape, a plate shape, a mesh shape, a non-woven fabric shape, and a foam shape. In addition, in order to improve adhesion with respect to the first active material layer 22, carbon or the like may be disposed on the surface of the first current collector layer 21 or the surface may be roughened.

The first active material layer 22 (the positive electrode active material layers 22A and 22B) contains a positive electrode active material that transfer lithium ions and electrons. The positive electrode active material is not particularly limited as long as it is a material that can reversibly release and occlude lithium ions and transfer electrons, and any known positive electrode active material that can be applied to the positive electrode of the all-solid-state lithium ion battery can be used. For example, composite oxides such as lithium cobalt oxide ($LiCoO_2$), lithium nickel oxide ($LiNiO_2$), lithium manganese oxide ($LiMn_2O_4$), oxide solid solutions ($Li_2MnO_3$-$LiMO_2$ (M=Co, Ni, etc.)), lithium-manganese-nickel-cobalt oxide ($LiNi_xMn_yCo_zO_2$, x+y+z=1), and olivine-type lithium phosphorus oxide ($LiFePO_4$); conductive polymers such as polyaniline and polypyrrole; sulfides such as $Li_2S$, CuS, Li—Cu—S compounds, and $TiS_2$, FeS, $MoS_2$, Li—Mo—S compounds; and a mixture of sulfur and carbon; and the like may be exemplified. The positive electrode active material may be composed of one of the above materials or two or more thereof.

The first active material layer 22 contains a positive electrode active material and a solid electrolyte that transfers lithium ions. The solid electrolyte is not particularly limited as long as it has lithium ion conductivity, and a material used for an all-solid-state lithium ion battery can be generally used. Examples thereof include inorganic solid electrolytes such as a sulfide solid electrolyte material, an oxide solid electrolyte material, a halide solid electrolyte, and a lithium-containing salt, polymer-based solid electrolytes such as a polyethylene oxide, and gel-like solid electrolytes containing a lithium-containing salt and a lithium-ion-conductive ionic liquid. Among these, a sulfide solid electrolyte material is preferable in consideration of high conductivity characteristics of lithium ions, structural moldability according to pressing, and favorable interfacial bonding properties.

The solid electrolyte may be composed of one or more of the above materials. The solid electrolyte contained in the positive electrode active material layers 22A and 22B may be the same material as or a different material from the solid electrolyte contained in negative electrode active material layers 32A and 32B and the solid electrolyte layer 40.

The first active material layer 22 may contain a conductive aid in order to improve the conductivity of the positive electrode 20. As the conductive aid, a conductive aid that can be used for an all-solid-state lithium-ion battery can be generally used. Examples thereof include carbon materials such as carbon black such as acetylene black and ketjen black; carbon fibers; gas phase method carbon fibers; graphite powder; and carbon nanotubes. The conductive aid may be composed of one or more of the above materials.

In addition, the first active material layer 22 may contain a binder having a function of binding positive electrode active material together, and a positive electrode active material and the first current collector layer 21.

In the present embodiment, the positive electrode active material layers 22A and 22B are formed on both main surfaces of the first current collector layer 21, but the present disclosure is not limited thereto, and any of the positive electrode active material layers 22A and 22B may be formed on one main surface of the first current collector layer 21. In addition, when the positive electrode 20 is a single-side-coated electrode, a laminated positive electrode laminated so that current collector surfaces of two positive electrodes are aligned may be used as a double-side-coated electrode. In addition, when the first current collector layer 21 has a 3D porous structure such as a mesh shape, a non-woven fabric shape, or a foam shape, the first current collector layer 21 may be provided integrally with the positive electrode active material layers 22A and 22B.

(Negative Electrode)

In the negative electrode 30, a second current collector layer 31 and a second active material layer 32 containing at least a solid electrolyte are laminated. In the present embodiment, the negative electrode 30 includes the second current collector layer 31 and the negative electrode active material layers 32A and 32B which are formed on both main surfaces of the second current collector layer 31 and contain a negative electrode active material and a solid electrolyte. Thus, in a direction perpendicular to the lamination direction, the area of the second active material layer 32 in the negative electrode 30 is larger than the area of the first active material layer 22 in the positive electrode 20. Thereby, it is possible to prevent lithium electrodeposition at the outer peripheral part of the electrode.

Like the first current collector layer 21, the second current collector layer 31 is preferably composed of at least one substance having high conductivity. Examples of highly conductive substances include metals or alloys containing at least one of silver (Ag), palladium (Pd), gold (Au), platinum (Pt), aluminum (Al), copper (Cu), chromium (Cr) and nickel (Ni), and non-metals such as carbon (C). In consideration of production cost in addition to high conductivity, copper, nickel or stainless steel is preferable. In addition, stainless steel does not easily react with the positive electrode active material, the negative electrode active material and the solid electrolyte. Therefore, if stainless steel is used for the second current collector layer 31, it is possible to reduce the internal resistance of the all-solid-state battery.

Examples of the shape of the second current collector layer 31 include a foil shape, a plate shape, a mesh shape, a non-woven fabric shape, and a foam shape. In addition, in order to improve adhesion with respect to the second active material layer 32, carbon or the like may be disposed on the surface of the second current collector layer 31 or the surface may be roughened.

The second active material layer 32 (the negative electrode active material layers 32A and 32B) contains a negative electrode active material that transfers lithium ions and electrons. The negative electrode active material is not particularly limited as long as it is a material that can reversibly release and occlude lithium ions and transfer electrons, and a known negative electrode active material that can be applied to the negative electrode of an all-solid-state lithium-ion battery can be used. Examples thereof include carbonaceous materials such as natural graphite, artificial graphite, resin charcoal, carbon fibers, activated carbon, hard carbon, and soft carbon; alloy-based materials mainly composed of tin, tin alloys, silicon, silicon alloys, gallium, gallium alloys, indium, indium alloys, aluminum, aluminum alloys or the like; conductive polymers such as polyacene, polyacetylene, and polypyrrole; metallic lithium; and lithium-titanium composite oxides (for example, $Li_4Ti_5O_{12}$). These negative electrode active materials may be composed of one of the above materials or two or more thereof.

The second active material layer 32 contains a negative electrode active material and a solid electrolyte that transfers lithium ions. The solid electrolyte is not particularly limited as long as it has lithium-ion conductivity, and a material used for an all-solid-state lithium ion battery can be generally used. Examples thereof include inorganic solid electrolytes such as a sulfide solid electrolyte material, an oxide solid electrolyte material, a halide solid electrolyte, and a lithium-containing salt, polymer-based solid electrolytes such as a polyethylene oxide, and gel-like solid electrolytes containing a lithium-containing salt and a lithium-ion-conductive ionic liquid. The solid electrolyte may be composed of one of the above materials or two or more thereof.

The solid electrolyte contained in the negative electrode active material layers 32A and 32B may be the same as or different from the solid electrolyte contained in the positive electrode active material layers 22A and 22B and the solid electrolyte layer 40.

The second active material layer 32 may contain a conductive aid, a binder and the like. These materials are not particularly limited, but for example, the same materials as those used for the positive electrode active material layers 22A and 22B described above can be used.

In the present embodiment, the negative electrode active material layers 32A and 32B are formed on both main surfaces of the second current collector layer 31, but the present disclosure is not limited thereto, and any of the negative electrode active material layers 32A and 32B may be formed on one main surface of the second current collector layer 31. For example, when the negative electrode 30 is formed on the lowest layer in the lamination direction of the laminate to be described below, there is no opposing positive electrode 20 below the negative electrode 30 positioned on the lowest layer. Therefore, in the negative electrode 30 positioned on the lowest layer, the negative electrode active material layer 32A may be formed on only one surface on the upper side in the lamination direction. In addition, when the second current collector layer 31 has a 3D porous structure such as a mesh shape, a non-woven fabric shape, or a foam shape, the second current collector layer 31 may be provided integrally with the negative electrode active material layers 32A and 32B.

(Solid Electrolyte Layer)

A first solid electrolyte layer 41 is disposed between the first active material layer 22 and the second active material layer 32. In the present embodiment, the first solid electrolyte layer 41 is disposed between the positive electrode active material layer 22B and the negative electrode active material layer 32A. Thus, in a direction perpendicular to the lamination direction, the area of the first solid electrolyte layer 41 is larger than the area of the first active material layer 22 in the positive electrode 20. Thereby, it is possible to prevent lithium electrodeposition at the outer peripheral part of the electrode. The first solid electrolyte layer 41 constitutes the solid electrolyte layer 40 together with a second solid electrolyte layer and a third solid electrolyte layer to be described below. The solid electrolyte layer 40 will be described below in detail.

The solid electrolyte is not particularly limited as long as it has lithium-ion conductivity and insulating properties, and a material used for an all-solid-state lithium ion battery can be generally used. Examples thereof include inorganic solid electrolytes such as a sulfide solid electrolyte material, an oxide solid electrolyte material, a halide solid electrolyte, and a lithium-containing salt, polymer-based solid electrolytes such as a polyethylene oxide, and gel-like solid electrolytes containing a lithium-containing salt and a lithium-ion-conductive ionic liquid. Among these, a sulfide solid electrolyte material is preferable in consideration of high conductivity characteristics of lithium ions, structural moldability according to pressing, and favorable interfacial bonding properties.

The form of the solid electrolyte material is not particularly limited, and examples thereof include a particle form.

The solid electrolyte layer 40 may contain an adhesive for imparting mechanical strength and flexibility.

In addition, the solid electrolyte sheet may include a porous substrate and a solid electrolyte held by the porous substrate. The form of the porous substrate is not particularly limited, and examples thereof include a woven fabric, a non-woven fabric, mesh cloth, a porous film, an expanding sheet, and a punching sheet. Among these forms, a non-woven fabric is preferable in consideration of handling properties that allow the amount of the solid electrolyte filled to be further increased.

The porous substrate is preferably composed of an insulating material. Thereby, it is possible to improve insulating properties of the solid electrolyte sheet. Examples of insulating materials include resin materials such as nylon, polyester, polyethylene, polypropylene, polytetrafluoroethylene, ethylene-tetrafluoroethylene copolymers, polyvinylidene fluoride, polyvinylidene chloride, polyvinyl chloride, polyurethane, vinylon, polybenzimidazole, polyimide, polyphenylene sulfide, polyether ether ketone, cellulose, and acrylic resins; natural fibers such as hemp, wood pulp, and cotton linters, and glass.

In the all-solid-state battery 1 configured as described above, the porosity $n1_{am}$ of the first active material layer 22 is 5% or less. In the first active material layer 22, voids are formed between particles of the positive electrode active material, between particles of the conductive aid, and between particles of the positive electrode active material—particles of the conductive aid, and the voids are filled with a solid electrolyte, which is a relatively soft material.

In the present embodiment, a theoretical density when the first active material layer is formed without voids is calculated from the combinational proportions (mass %) of materials such as the positive electrode active material, the solid electrolyte, and the conductive aid when the total mass of the first active material layer 22 is 100%, and the true densities of the materials. In addition, the mass and volume of the positive electrode 20 (the first active material layer 22) are measured, and the density is calculated from the measured values. Thus, a filling rate (relative density) is calculated from the difference between the theoretical density and the density based on the measured value, and as the apparent porosity, the porosity $n1_{am}$ of the first active material layer 22 (%) is calculated from the formula of {(porosity)=100−(filling rate)}.

In the all-solid-state battery, the solid electrolyte is densified by the pressing process, formation of an interface with the electrode active material and the conductive aid in the active material layer is promoted, and thus a small filling rate of each electrode obtained by the pressing process, that is, a small apparent porosity, is an important index. In the electrode of the all-solid-state battery, as indicated by square plots in FIG. 2, there is a correlation in which the filling rate increases and the resistance decreases as the press load increases. For example, when the resistance of the electrode of the all-solid-state battery of the present embodiment in which the press load is increased to 490 MPa and the filling rate increases is compared with the resistance of an electrode of a liquid lithium ion battery (liquid LIB) with a similar structural design, as shown in the drawing, the resistance of the electrode of the all-solid-state battery of the present embodiment becomes smaller than the resistance (certain value) of the electrode of the liquid lithium ion battery when the press load reaches a predetermined value or more, and when the press load is further increased, the resistance at 490 MPa becomes about 30% smaller than the initial resistance value.

Therefore, it can be understood that, in the all-solid-state battery of the present embodiment, in order to obtain low resistance and a high output, a press load of 490 MPa or more is required in the electrode pressing process, compared with a conventional liquid lithium ion battery.

Figure 3A:
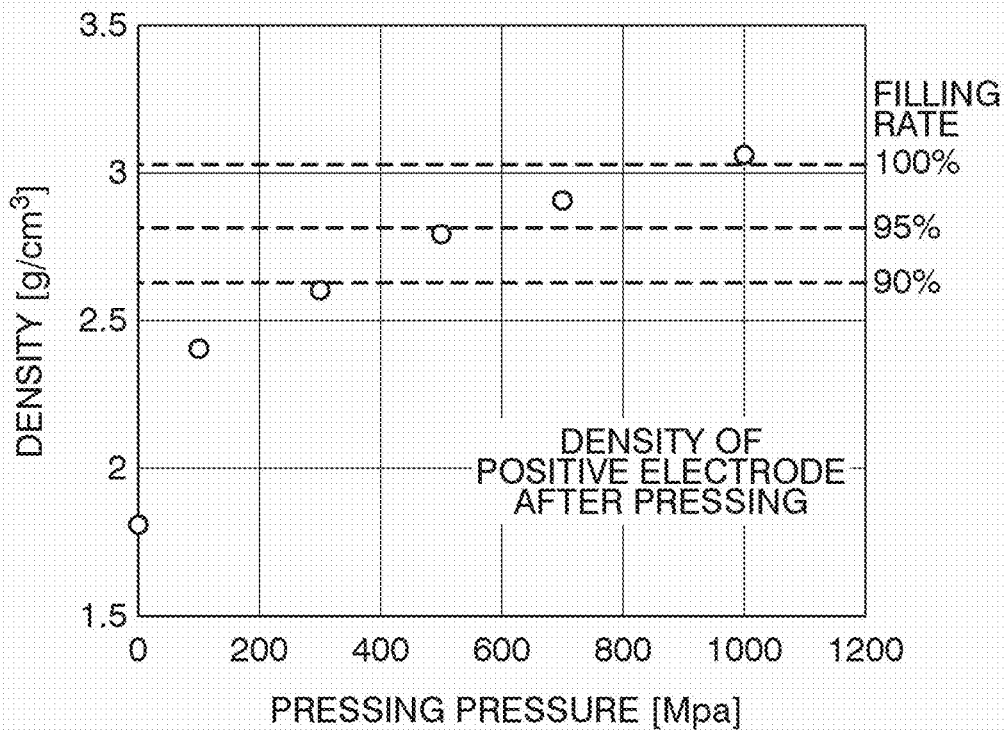
FIG. 3A is a graph for illustrating a porosity of a first active material layer.

FIG. 3A is a graph for illustrating the porosity of the first active material layer 22. As shown in FIG. 3A, when the press load increases in the pressing process of the positive electrode 20, the density of the first active material layer 22 increases, and particularly, when the press load is 490 MPa or more, the filling rate becomes 95% or more. In this case, the porosity is 5% or less according to the relationship of {(porosity)=100−(filling rate)}. Therefore, in the present embodiment, the porosity $n1_{am}$ of the first active material layer 22 is 5% or less, preferably 3% or less, and more preferably 1% or less. When the porosity $n1_{am}$ of the first active material layer 22 is 5% or less, the first active material layer 22 is sufficiently densified, and interface formation between particles containing a positive electrode active material, a conductive aid and the like is favorably constructed. As a result, the resistance of the positive electrode 20 becomes small, uniform densification is performed in the in-plane direction, the resistance distribution becomes uniform, the internal short circuiting can be prevented, and it is possible to increase the size and capacity of the laminate unit 10.

Figure 3B:
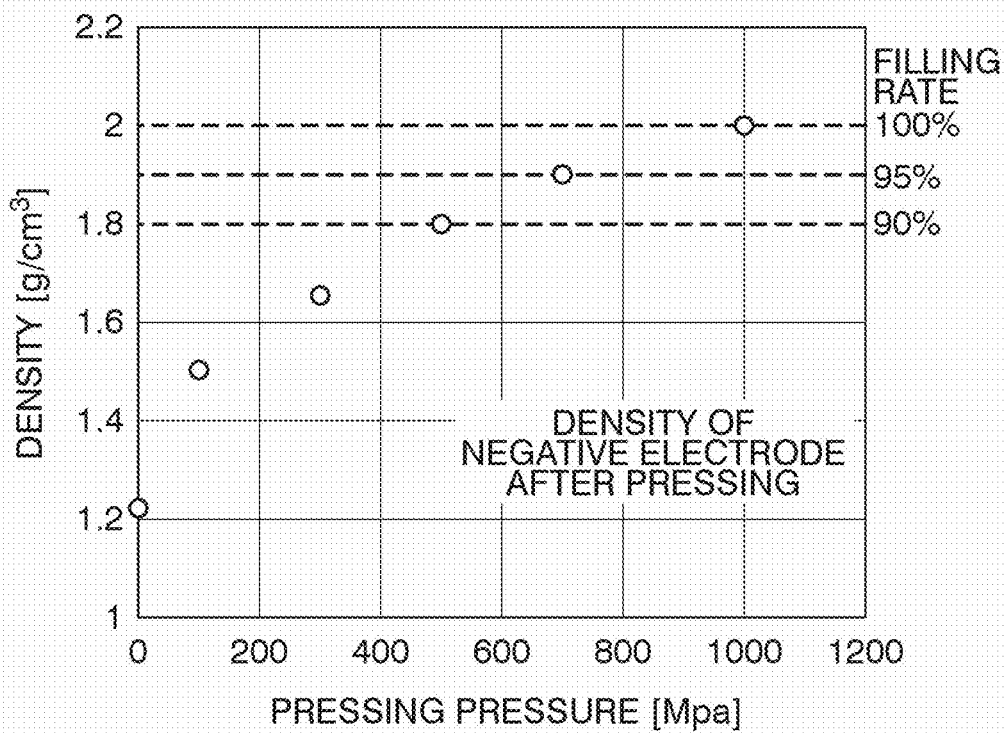
FIG. 3B is a graph for illustrating a porosity of a second active material layer.

FIG. 3B is a graph for illustrating the porosity of the second active material layer 32. As shown in FIG. 3B, when the press load increases in the pressing process of the negative electrode 30, the density of the second active material layer 32 increases, and particularly, when the press load is 490 MPa or more, the filling rate is 90% or more. In addition, as in the first active material layer 22, the porosity is 10% or less according to the relationship of {(porosity)=100−(filling rate)}. Therefore, in the present embodiment, the porosity $n_{2am}$ of the second active material layer 32 is preferably 10% or less, more preferably 5% or less, and still more preferably 1% or less. When the porosity $n1_{am}$ of the second active material layer 32 is 10% or less, the second active material layer 32 is sufficiently densified, and interface formation between particles including the negative electrode active material, the conductive aid and the like is favorably constructed. As a result, it is possible to reduce the resistance of the negative electrode 30, prevent internal short circuiting, and increase the size and capacity of the laminate unit 10.

In the present embodiment, a theoretical density when the second active material layer is formed without voids is calculated from combinational proportions (mass %) of materials such as the negative electrode active material, the solid electrolyte, and the conductive aid when the total mass of the second active material layer 32 is 100%, and the true densities of the materials. In addition, the mass and volume of the negative electrode 30 (the second active material layer 32) are measured, and the density is calculated from the measured values. Thus, a filling rate (relative density) is calculated from the difference between the theoretical density and the density based on the measured value, and as the apparent porosity, the porosity $n_{2am}$ of the second active material layer 32 (%) is calculated from the formula of {(porosity)=100−(filling rate)}.

Figure 4A:
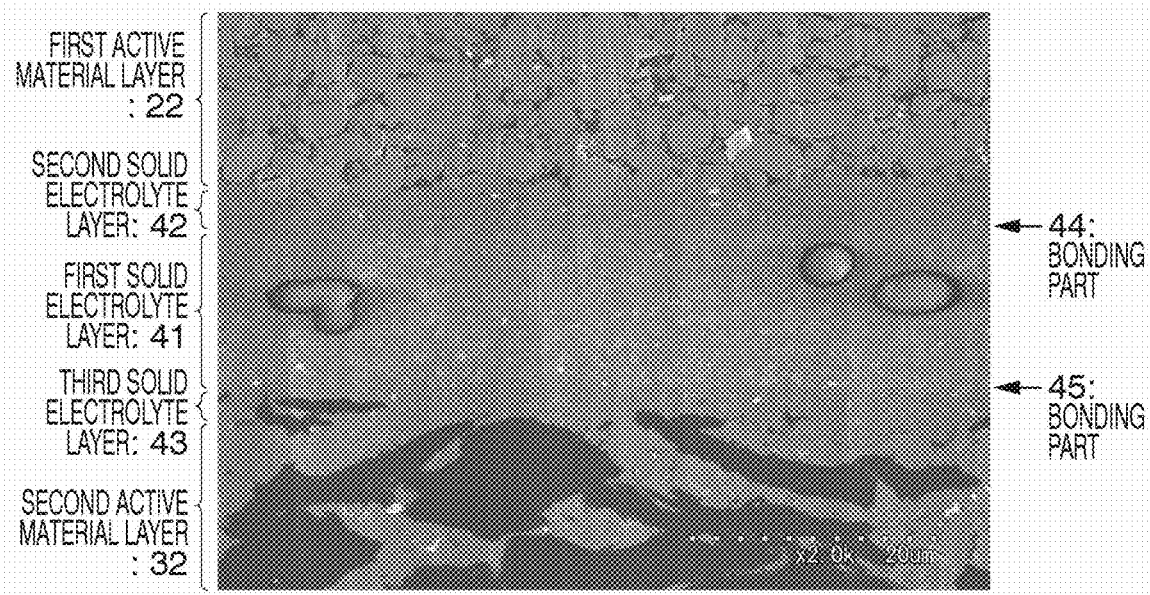
FIG. 4A is an electron microscopic image showing an example of a configuration of a solid electrolyte layer in the laminate unit.

FIG. 4A is an electron microscopic image showing an example of a configuration of the solid electrolyte layer 40 in the laminate unit 10.

As shown in FIG. 4A, the laminate unit 10 further includes the first solid electrolyte layer 41, and a second solid electrolyte layer 42 positioned between the first active material layer 22 and the first solid electrolyte layer 41. The second solid electrolyte layer 42 is bonded to the first active material layer 22 and is also bonded to the first solid electrolyte layer 41.

A bonding part 44 is formed between the first solid electrolyte layer 41 and the second solid electrolyte layer 42. In a process of forming a laminate unit to be described below, the bonding part 44 is formed by pressurizing when the first solid electrolyte layer 41 and the second solid electrolyte layer 42 are laminated. Since the density of the second solid electrolyte layer 42 is higher than the density of the first solid electrolyte layer 41, it is possible to easily confirm the bonding part 44 formed at these boundaries using an electron microscopic image or the like.

The first solid electrolyte layer 41 is not particularly limited, and is composed of, for example, a solid electrolyte sheet. The solid electrolyte sheet contains a solid electrolyte having electrical insulation properties and lithium-ion conductivity. For example, in the process of forming the laminate unit 10, after a slurry containing a solid electrolyte is intermittently applied to a coating substrate such as a PET film, peeling is performed from the coating substrate after drying and rolling as necessary, and thus a solid electrolyte sheet can be obtained.

The second solid electrolyte layer 42 is composed of, for example, a solid electrolyte film. The solid electrolyte film contains a solid electrolyte having electrical insulation properties and lithium-ion conductivity. For example, in the process of forming the positive electrode 20, a slurry containing a solid electrolyte is applied to the first active material layer 22, and pressing and drying are then performed, and thereby a solid electrolyte film can be obtained.

In the solid electrolyte layer 40 configured as described above, the porosity $n2_{se}$ of the second solid electrolyte layer 42 is preferably smaller than the porosity $n1_{se}$ of the first solid electrolyte layer 41. When the porosity $n2_{se}$ of the second solid electrolyte layer 42 is made less than the porosity $n1_{se}$ of the first solid electrolyte layer 41, compared with when the solid electrolyte layer 40 is formed of only the first solid electrolyte layer 41, the solid electrolyte layer 40 can be further densified, and the resistance of the solid electrolyte layer 40 can be reduced.

The porosity $n2_{se}$ of the second solid electrolyte layer 42 is preferably 5% or less, more preferably 3% or less, and still more preferably 1% or less. Thereby, the second solid electrolyte layer 42 can be further densified, and the resistance of the solid electrolyte layer 40 can be further reduced.

The porosity $n1_{se}$ of the first solid electrolyte layer 41, the porosity $n1_{am}$ of the first active material layer 22 and the porosity $n2_{se}$ of the second solid electrolyte layer 42 preferably satisfy the relationship of $n1_{se} > n1_{am} \geq n2_{se}$. Thereby, the positive electrode 20 and the solid electrolyte layer 40 can be further densified, the resistance in the electrode of the positive electrode 20 can be reduced, and the resistance of the laminate unit 10 can be reduced.

In the present embodiment, a theoretical density when the first solid electrolyte layer is formed without voids is calculated from the combinational proportions (mass %) of materials such as the positive electrode active material, the substrate, and the adhesive when the total mass of the first solid electrolyte layer 41 is 100%, and the true densities of the materials. In addition, the mass and volume of the first solid electrolyte layer 41 are measured, and the density is calculated from the measured values. Thus, a filling rate (relative density) is calculated from the difference between the theoretical density and the density based on the measured value, and as the apparent porosity, the porosity $n1_{am}$ of the first solid electrolyte layer 41 (%) is calculated from the formula of {(porosity)=100−(filling rate)}. The porosity $n2_{se}$ of the second solid electrolyte layer 42 (%) is also calculated by the same method as in the porosity $n1_{am}$ of the first solid electrolyte layer 41.

The thickness of the second solid electrolyte layer 42 is preferably 7 μm or less and more preferably 3 μm or less in consideration of maximizing the energy density according to thin layering. In addition, the thickness of the first solid electrolyte layer 41 is preferably 5 μm or more and 15 μm or less and more preferably 5 μm or more and 10 μm or less in consideration of favorable bonding properties and insulating properties with respect to the second solid electrolyte layer 42. Thereby, the solid electrolyte layer 40 can be thinned, the energy density of the all-solid-state battery 1 can be improved, and sufficient insulating properties can be provided.

In addition, the laminate unit 10 may further include a third solid electrolyte layer 43 positioned between the second active material layer 32 and the first solid electrolyte layer 41. The third solid electrolyte layer 43 is bonded to the second active material layer 32 and bonded to the second solid electrolyte layer 42. A bonding part 45 is formed between the third solid electrolyte layer 43 and the first solid electrolyte layer 41.

The third solid electrolyte layer 43 is composed of, for example, a solid electrolyte film. The solid electrolyte film contains a solid electrolyte having electrical insulation properties and lithium ion conductivity. For example, in the process of forming the negative electrode 30, a slurry containing a solid electrolyte is applied to the second active material layer 32, and pressing and drying are then performed. Thereby, a solid electrolyte film can be obtained.

In this case, the porosity $n3_{se}$ of the third solid electrolyte layer 43 is preferably smaller than the porosity $n1_{se}$ of the first solid electrolyte layer 41. When the porosity $n3_{se}$ of the third solid electrolyte layer 43 is smaller than the porosity $n1_{se}$ of the first solid electrolyte layer 41, compared with when the solid electrolyte layer 40 is formed of only the first solid electrolyte layer 41, the resistance of the solid electrolyte layer 40 can be further reduced.

The porosity $n3_{se}$ of the third solid electrolyte layer 43 is preferably 10% or less, more preferably 3% or less, and still more preferably 1% or less. Thereby, the third solid electrolyte layer 43 can be further densified, and the resistance of the solid electrolyte layer 40 can be further reduced. The porosity $n3_{se}$ of the third solid electrolyte layer 43 is also calculated by the same method as in the porosity $n1_{am}$ of the first solid electrolyte layer 41.

The porosity $n1_{se}$ of the first solid electrolyte layer 41, the porosity $n2_{am}$ of the second active material layer 32 and the porosity $n3_{se}$ of the third solid electrolyte layer 43 preferably satisfy the relationship of $n1_{se} > n2_{am} \geq n3_{se}$. Thereby, the negative electrode 30 and the solid electrolyte layer 40 can be further densified, the resistance in the electrode of the negative electrode 30 can be reduced, and the resistance of the laminate unit 10 can be reduced.

The thickness of the third solid electrolyte layer 43 is preferably 7 μm or less and more preferably 3 μm or less in consideration of maximizing the energy density according to thin layering. Thereby, the solid electrolyte layer 40 can be thinned, the energy density of the all-solid-state battery 1 can be further improved, and sufficient insulating properties can be provided.

When the all-solid-state battery 1 includes the first solid electrolyte layer 41, the second solid electrolyte layer 42 and the third solid electrolyte layer 43, the overall thickness of the first solid electrolyte layer 41, the second solid electrolyte layer 42 and the third solid electrolyte layer 43 is preferably 1 μm or more and 20 μm or less and more preferably 10 μm or more and 20 μm or less in consideration of maximizing the energy density according to thin layering.

The solid electrolyte layer 40 may be composed of the first solid electrolyte layer 41, the second solid electrolyte layer 42 and the third solid electrolyte layer 43 or may be composed of the first solid electrolyte layer 41 and the second solid electrolyte layer 42. In addition, the solid electrolyte layer 40 may be composed of the first solid electrolyte layer 41 and the third solid electrolyte layer 43 or may be composed of the first solid electrolyte layer 41.

Figure 4B:
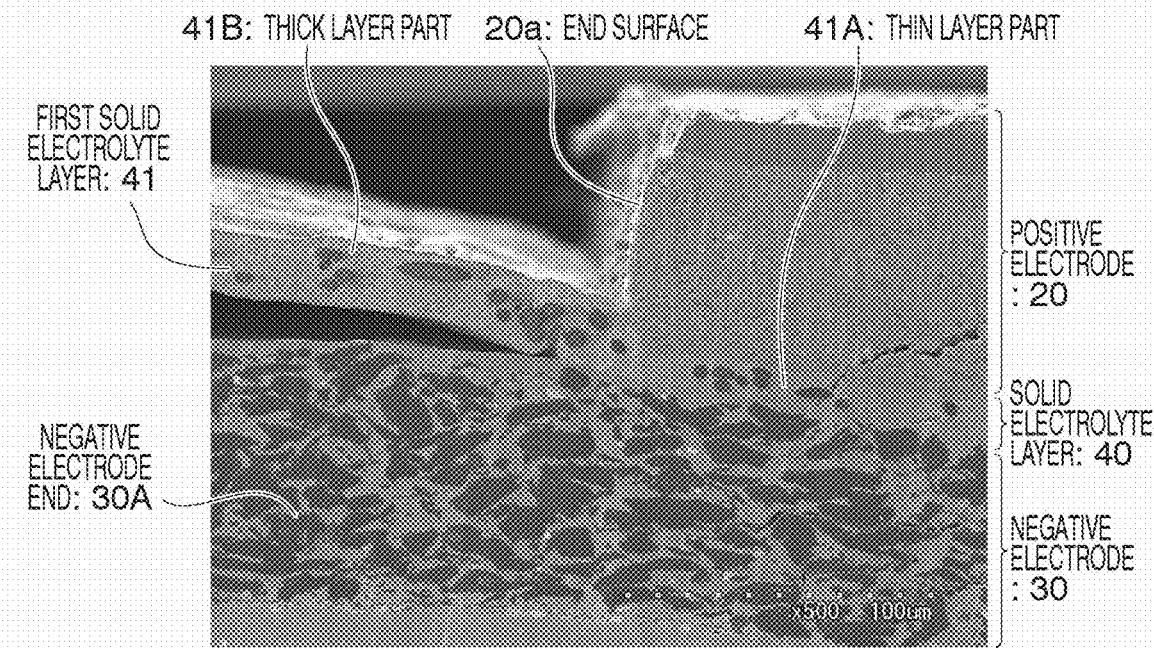
FIG. 4B is an electron microscopic image showing an example of a configuration of an end of a positive electrode in the laminate unit.

FIG. 4B is an electron microscopic image showing an example of a configuration of an end of a positive electrode in the laminate unit 10.

As shown in FIG. 4B, the positive electrode 20 of which a part is embedded in the first solid electrolyte layer 41 in the lamination direction is provided. The first solid electrolyte layer 41 has a stepped shape in the vicinity of an end surface 20a of the positive electrode 20.

In the present embodiment, in the method of producing an all-solid-state battery to be described below, an end surface is formed by processing such as punching when the positive electrode 20 is formed, and the laminate unit 10 is then formed with a smaller press load than in the case of conventional batch pressing. Therefore, shape change such as swelling of the end of the positive electrode after processing in the lateral direction and curving of the end surface is unlikely to occur, and the end surface 20a of the positive electrode 20 has a shape obtained by processing, that is, a substantially planar shape in the lamination direction.

In addition, in the present embodiment, in the method of producing an all-solid-state battery to be described below, before the laminate unit 10 is pressed, the negative electrode 30 is formed by pressing the electrode in the electrode forming process. Therefore, after the electrode forming process and before the laminate unit 10 is pressed, within the negative electrode 30 having a larger area than the positive electrode 20, a part in which the positive electrode 20 is provided at the opposite position is densified, and a part in which the positive electrode 20 is not provided at the opposite position, that is, a part corresponding to a thick layer part 41B of the first solid electrolyte layer 41 is not densified.

Figure 5A:
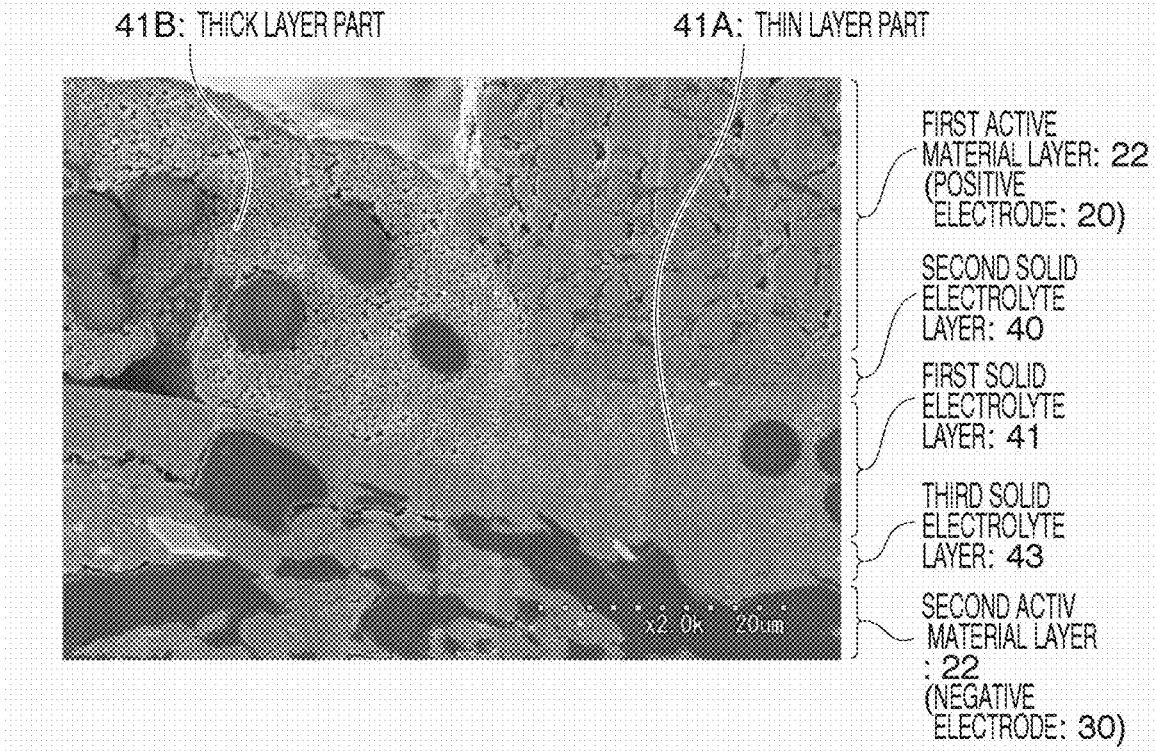
FIG. 5A is an electron microscopic image showing details of a first solid electrolyte layer in the laminate unit.

FIG. 5A is an electron microscopic image showing details of the first solid electrolyte layer 41 in the laminate unit 10.

The first solid electrolyte layer 41 includes a thin layer part 41A corresponding to a part in which the positive electrode 20 is provided at the opposite position and the thick layer part 41B corresponding to a part in which the positive electrode 20 is not provided at the opposite position. The first solid electrolyte layer 41 used in the laminate unit forming process to be described below is, for example, a layer that is pressurized with a press load smaller than the press load in the laminate unit forming process or a layer that is not pressurized. As shown in the drawing, the density of the thin layer part 41A is clearly different from the density of the thick layer part 41B, and the density of the thin layer part 41A is higher than the density of the thick layer part 41B.

Figure 5B:
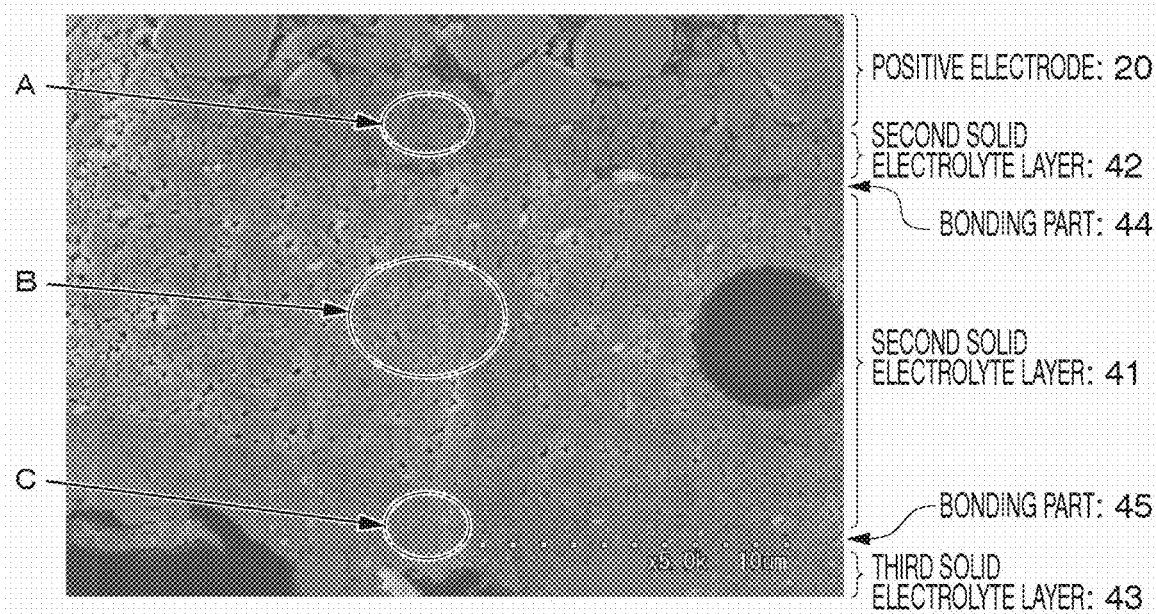
FIG. 5B is an electron microscopic image for illustrating densities of first to third solid electrolyte layers constituting a solid electrolyte layer of the laminate unit.

FIG. 5B is an electron microscopic image for illustrating the densities of the first solid electrolyte layer 41, the second solid electrolyte layer 42 and the third solid electrolyte layer 43 constituting the solid electrolyte layer 40 of the laminate unit 10.

In the present embodiment, in the method of producing an all-solid-state battery to be described below, before the batch pressing is performed on the laminate unit 10, the positive electrode 20 and the negative electrode 30 are formed by the electrode press in the electrode forming process, and the laminate unit 10 is then formed with a smaller press load than in the case of the electrode press. In this case, it is preferable to press the positive electrode when the second solid electrolyte layer 42 is laminated on the first active material layer 22 of the positive electrode 20, and similarly, it is preferable to press the negative electrode when the third solid electrolyte layer 43 is laminated on the second active material layer 32 of the negative electrode 30. Thereby, the density of the second solid electrolyte layer 42 (for example, the part A in the drawing) is higher than the density of the first solid electrolyte layer 41 (for example, the part B in the drawing). In addition, the density of the third solid electrolyte layer 43 (for example, the part C in the drawing) is also higher than the density of the first solid electrolyte layer 41 (for example, the B part in the drawing). According to the difference in the density, the presence of the bonding part 44 between the first solid electrolyte layer 41 and the second solid electrolyte layer 42, and the bonding part 45 between the first solid electrolyte layer 41 and the third solid electrolyte layer 43 can be confirmed.

Figure 6:
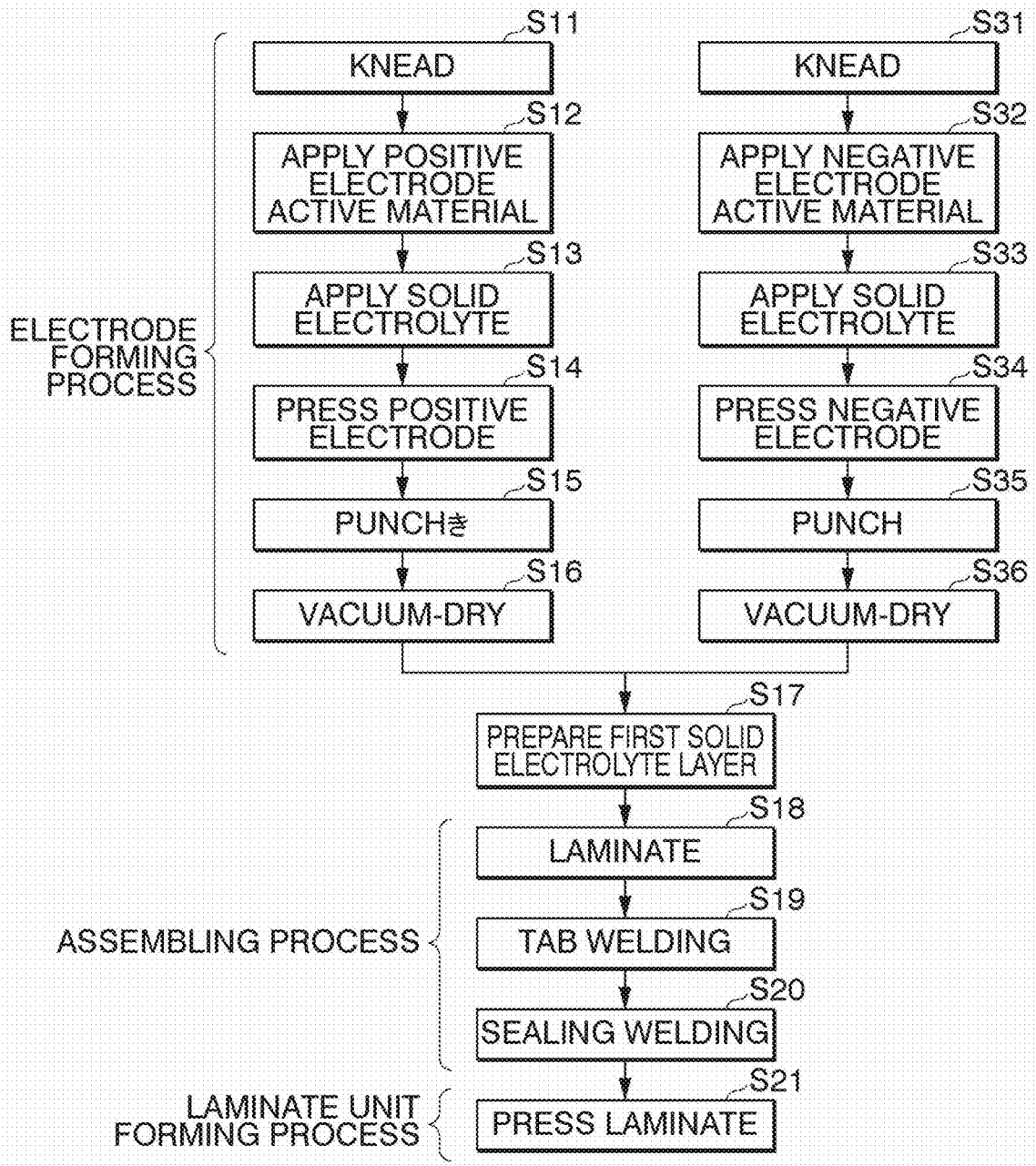
FIG. 6 is a flowchart showing an example of a method of producing an all-solid-state battery according to an embodiment of the present disclosure.
Figure 7:
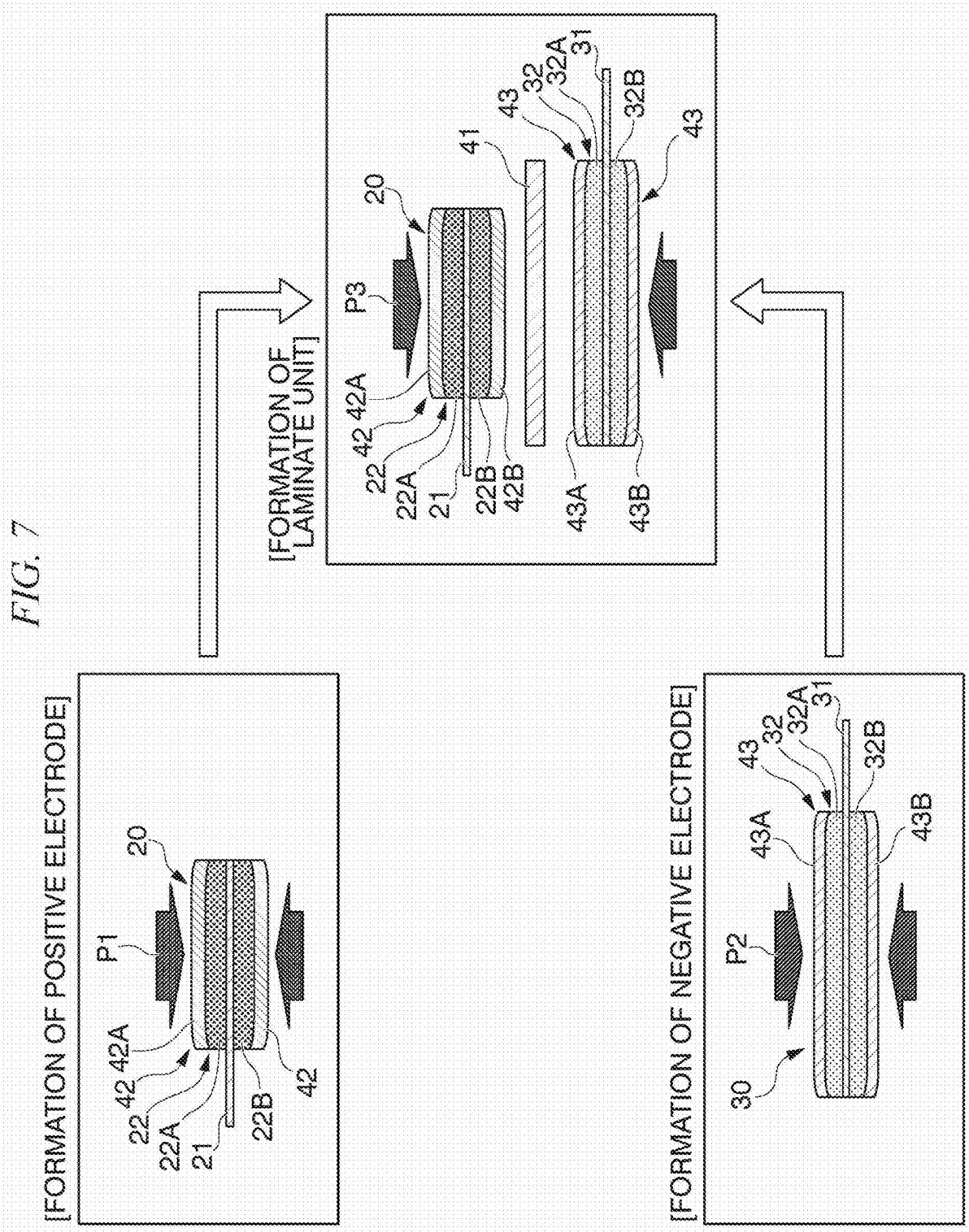
FIG. 7 is a schematic view for illustrating the method of producing an all-solid-state battery in FIG. 6.

FIG. 6 is a flowchart showing an example of a method of producing the all-solid-state battery 1 according to the present embodiment, and FIG. 7 is a schematic view for illustrating the method of producing an all-solid-state battery in FIG. 6. In the present embodiment, a case in which the second solid electrolyte layer 42 and the third solid electrolyte layer 43 are formed in the electrode forming process will be exemplified.

First, pressurizing is performed when the first current collector layer 21 and the first active material layer 22 containing at least a solid electrolyte are laminated, and the positive electrode 20 is formed.

For example, as shown in FIG. 6, a positive electrode active material, a solid electrolyte, a conductive aid, and a binder are mixed to knead a positive electrode mixture, and this positive electrode mixture is dispersed in a predetermined solvent to prepare a positive electrode mixture slurry (Step S11). This positive electrode mixture slurry is applied to a positive electrode current collector to form the positive electrode active material layers 22A and 22B (Step S12). Next, in the present embodiment, a solid electrolyte slurry in which a solid electrolyte is dispersed in a predetermined solvent is applied to the positive electrode active material layers 22A and 22B to form second solid electrolyte layers 42A and 42B (Step S13), and a positive electrode green sheet is prepared. When the second solid electrolyte layer 42 is formed on the first active material layer 22, in the laminate unit forming process to be described below, the adhesion between the first solid electrolyte layer 41 and the second solid electrolyte layer 42 can be promoted during interfacial bonding of the positive electrode 20 and the first solid electrolyte layer 41. In addition, in order to prevent warping of the positive electrode 20 after pressing, it is preferable to form the second solid electrolyte layers 42A and 42B on both surfaces of the positive electrode 20, that is, the positive electrode active material layers 22A and 22B.

Next, the positive electrode is pressed with a roll press machine or the like (Step S14, FIG. 7). In the present embodiment, in this process of forming the positive electrode 20, the second solid electrolyte layers 42A and 42B that are additionally laminated on the positive electrode active material layers 22A and 22B are pressurized while heating as necessary. The pressure P1 during pressing of the positive electrode in the process of forming the positive electrode 20 is preferably 98 MPa or more and 980 MPa or less and more preferably 490 MPa or more and 980 MPa or less. When the pressure P1 during pressing of the positive electrode is set to 98 MPa or more and 980 MPa or less, the positive electrode active material layers 22A and 22B and the second solid electrolyte layers 42A and 42B can be further densified.

Then, punching (Step S15) and vacuum-drying (Step S16) are performed, and the densified positive electrode active material layers 22A and 22B and second solid electrolyte layers 42A and 42B are formed to prepare the positive electrode 20. Accordingly, a plurality of positive electrodes 20 are prepared.

Similarly, pressurizing is performed when the second current collector layer 31 and the second active material layer 32 which contains at least a solid electrolyte and has an area larger than the area of the first active material layer 22 in a direction perpendicular to the lamination direction are laminated, and the negative electrode 30 is formed.

For example, a negative electrode active material, a solid electrolyte, a conductive aid, and a binder are mixed to knead a negative electrode mixture, and this negative electrode mixture is dispersed in a predetermined solvent to prepare a negative electrode mixture slurry (Step S31). Next, the negative electrode mixture slurry is applied to a negative electrode current collector so that the second active material layer 32 has an area larger than the area of the first active material layer 22 to form the negative electrode active material layers 32A and 32B (Step S32), additionally, a solid electrolyte slurry in which a solid electrolyte is dispersed in a predetermined solvent is applied to the negative electrode active material layers 32A and 32B to form third solid electrolyte layers 43A and 43B (Step S33), and a negative electrode green sheet is prepared.

Then, the negative electrode is pressed with a roll press machine or the like (Step S34, FIG. 7). In the present embodiment, this process of forming the negative electrode 30, the third solid electrolyte layers 43A and 43B that are additionally laminated on the negative electrode active material layers 32A and 32B are pressurized while heating as necessary. The pressure P2 during pressing of the negative electrode in the process of forming the negative electrode 30 is preferably 98 MPa or more and 980 MPa or less and more preferably 490 MPa or more and 980 MPa or less. When the pressure P2 during pressing of the negative electrode is set to 98 MPa or more and 980 MPa or less, the negative electrode active material layers 32A and 32B and the third solid electrolyte layers 43A and 43B can be further densified.

Since the negative electrode 30 has low reactivity between the negative electrode active material and the solid electrolyte, it can be densified at a higher temperature, and thus the filling rate of the second active material layer 32 of the negative electrode 30 can be set to equal to or higher than the filling rate of the first active material layer 22 of the positive electrode 20. On the other hand, when the filling rate is increased by promoting particle growth according to the same degree of pressurization or heat in conventional batch pressing, it is difficult to increase the filling rate of the negative electrode active material layer, and there is a limit to lowering the resistance.

Then, punching (Step S35) and vacuum-drying (Step S36) are performed, and the densified negative electrode active material layers 32A and 32B and third solid electrolyte layers 43A and 43B are formed to prepare the negative electrode 30. Accordingly, a plurality of negative electrodes 30 are prepared.

Next, a first solid electrolyte layer is prepared. For example, a solid electrolyte slurry in which a solid electrolyte is dispersed in a predetermined solvent is prepared. Thus, this solid electrolyte slurry is applied to the substrate so that the first solid electrolyte layer 41 has a larger area than the first active material layer 22 in a direction perpendicular to the lamination direction, a solid electrolyte green sheet is prepared, the solvent is then dried, compression is performed with a roll press machine or the like as necessary, and thereby the first solid electrolyte layer 41 is prepared (Step S17). Accordingly, a plurality of first solid electrolyte layers 41 are prepared.

When the second solid electrolyte layer 42 and the third solid electrolyte layer 43 are formed on the positive electrode 20 and the negative electrode 30, the first solid electrolyte layer 41 can be thinned. In addition, by allowing an insulating solid electrolyte layer to be present on each electrode, it is possible to prevent short circuiting due to contact between positive and negative electrodes in the first solid electrolyte layer 41 while minimizing the occurrence of contamination such as pinholes and conductive materials, and it is possible to significantly improve the reliability.

Next, pressurizing is performed when the positive electrode 20, the first solid electrolyte layer 41 having a larger area than the first active material layer 22 in a direction perpendicular to the lamination direction, and the negative electrode 30 are laminated in that order, and the laminate unit 10 is formed.

For example, the positive electrode 20 and the negative electrode 30 are alternately laminated (Step S18), and the first solid electrolyte layer 41 is interposed between the positive electrode 20 and the negative electrode 30 to form a laminate composed of a plurality of laminate units 10. Then, each of the positive electrode 20 and the negative electrode 30 is subjected to tab welding (Step S19) and sealing welding (Step S20), the laminate is pressed in the vertical direction with a laminate press (Step S21, FIG. 7), and the all-solid-state battery 1 including the laminate is obtained.

In the process of forming a laminate unit, the first solid electrolyte layer 41, the second solid electrolyte layer 42 and the third solid electrolyte layer 43 are bonded. This process of bonding the first solid electrolyte layer 41, the second solid electrolyte layer 42 and the third solid electrolyte layer 43 is also called a formation process. Since the second solid electrolyte layer 42 is made of the same material as the first solid electrolyte layer 41, a strong bond between the first solid electrolyte layer 41 and the positive electrode 20 can be formed compared with when the first solid electrolyte layer 41 and the first active material layer 22 are bonded without providing the second solid electrolyte layer 42. Similarly, since the third solid electrolyte layer 43 is made of the same material as the first solid electrolyte layer 41, a stronger bond between the first solid electrolyte layer 41 and the negative electrode 30 can be formed compared with when the first solid electrolyte layer 41 and the second active material layer 32 are bonded without providing the third solid electrolyte layer 43.

The pressure P3 in the process of forming the laminate unit 10 is preferably lower than either the pressure P1 in the process of forming the positive electrode 20 or the pressure P2 in the process of forming the negative electrode 30. Thereby, a bond between the second solid electrolyte layer 42 of the positive electrode 20 and the first solid electrolyte layer 41 is favorably formed, and a bond between the third solid electrolyte layer 43 of the negative electrode 30 and the first solid electrolyte layer 41 is favorably formed. In addition, the solid electrolyte layer 40 does not easily break when the laminate is pressed, and it is possible to minimize the occurrence of a short circuit due to contact between the positive electrode 20 and the negative electrode 30.

The pressure P3 in the process of forming the laminate unit 10 is preferably 0.1 MPa or more and 10 MPa or less and more preferably 0.1 MPa or more and 5 MPa or less. When the pressure P3 is 0.1 MPa or more and 10 MPa or less, it is possible to prevent the laminate unit 10 from breaking and bonding can be realized at low cost.

In the process of forming the laminate unit 10, the unpressurized first solid electrolyte layer 41 may be disposed between the positive electrode 20 and the negative electrode 30 and pressurized. In the case of no pressurization, since the first solid electrolyte layer 41 is clayey, the first solid electrolyte layer 41 and the second solid electrolyte layer 42 are more favorably bonded, and the first solid electrolyte layer 41 and the third solid electrolyte layer 43 can be more favorably bonded.

In addition, in the process of forming the laminate unit 10, for example, as a first process of performing aging, the laminate unit 10 may be pressurized while heating. Thereby, it is possible to realize densification of the first solid electrolyte layer 41, the second solid electrolyte layer 42 and the third solid electrolyte layer 43 by a sintering operation. The heating temperature of the laminate unit 10 is preferably 80° C. or higher and 200° C. or lower and more preferably 100° C. or higher and 150° C. or lower. When the heating temperature of the laminate unit 10 is 80° C. or higher and 200° C. or lower, further densification can be realized by the sintering operation of the solid electrolyte, and it is possible to prevent the positive electrode active material from reacting with the solid electrolyte and deteriorating.

In addition, in the above embodiment, in the electrode forming process, both the second solid electrolyte layer 42 and the third solid electrolyte layer 43 are formed, but the present disclosure is not limited thereto, and any of the second solid electrolyte layer 42 and the third solid electrolyte layer 43 may be formed, and it is not necessary to form both the second solid electrolyte layer 42 and the third solid electrolyte layer 43.

As described above, according to the present embodiment, in a direction perpendicular to the lamination direction, the area of the second active material layer 32 in the negative electrode 30 is larger than the area of the first active material layer 22 in the positive electrode 20, and in a direction perpendicular to the lamination direction, the area of the first solid electrolyte layer 41 is larger than the area of the first active material layer 22 in the positive electrode 20, and additionally, when the porosity $n1_{am}$ of the first active material layer 22 is 5% or less, interface formation between particles containing a positive electrode active material, a conductive aid and the like in the first active material layer 22 is favorably constructed. As a result, the resistance of the positive electrode 20 becomes small, uniform densification is performed in the in-plane direction, the resistance distribution becomes uniform, the internal short circuiting can be prevented, and it is possible to increase the size and capacity of the laminate unit 10.

In addition, according to the present embodiment, pressurizing is performed when the first current collector layer 21 and the first active material layer 22 containing at least a solid electrolyte are laminated, and the positive electrode 20 is formed (Step S14), pressurizing is performed when the second current collector layer 31 and the second active material layer 32 which contains at least a solid electrolyte and has an area larger than the area of the first active material layer 22 in a direction perpendicular to the lamination direction are laminated, and the negative electrode 30 is formed (Step S34). Next, pressurizing is performed when the positive electrode 20, the first solid electrolyte layer 41 having a larger area than the first active material layer 22 in a direction perpendicular to the lamination direction, and the negative electrode 30 are laminated in that order, and the laminate unit 10 is formed (Step S21). Accordingly, since the positive electrode 20 and the negative electrode 30 can be densified in the state of the electrodes alone, it is possible to construct favorable interface formation between particles in the first active material layer 22. In addition, since the positive electrode 20, the first solid electrolyte layer 41 and the negative electrode 30 are bonded after that, the laminate unit 10 is formed with a smaller press load as compared with conventional batch pressing, and thus, it is possible to prevent short circuiting due to breakage of the laminate structure such as the first solid electrolyte layer 41. Also, a laminate structure having the thinned first solid electrolyte layer 41 can be stably produced. In addition, since the positive electrode 20 and the negative electrode 30 can be pressed under suitable conditions (pressure, temperature and the like) using a low-cost roll press or the like in the formation of the electrode, it is possible to increase the size and capacity of the laminate unit 10 at low cost. In addition, it is possible to perform designing so that the resistance of each of the positive electrode 20 and the negative electrode 30 can be minimized.

In the method of producing an all-solid-state battery of the present embodiment, after the second solid electrolyte layer 42 is formed on the first active material layer 22, both the first active material layer 22 and the second solid electrolyte layer 42 are pressed at the pressure P1 (Step S14, FIG. 7), and the production method of the present disclosure is not limited thereto. For example, as shown in FIG. 8, the first active material layer 22 is formed on the first current collector layer 21 and pressed at a pressure P1', the second solid electrolyte layer 42 is then formed on the first active material layer 22 and the positive electrode may be pressed at a pressure P1 (P1'≤P1). In addition, similarly, the second active material layer 32 is formed on the second current collector layer 31 and pressed at a pressure P1', the third solid electrolyte layer 43 is then formed on the second active material layer 32, and the negative electrode may be pressed at a pressure P1 (P1'≤P1). In this manner, the first active material layer 22 is formed and pressed at a pressure P1', the second solid electrolyte layer 42 is then formed, and thus infiltration of the solid electrolyte slurry into the first active material layer 22 can be minimized, the second solid electrolyte layer 42 having a uniform film thickness can be formed, and the first active material layer 22 according to the electrode design can be obtained. Similarly for the negative electrode, the second active material layer 32 is formed and pressed at a pressure P2', the third solid electrolyte layer 43 is then formed, and thus infiltration of the solid electrolyte slurry into the second active material layer 32 can be minimized, the third solid electrolyte layer 43 having a uniform film thickness can be formed, and the second active material layer 32 according to the electrode design can be obtained.

While embodiments of the present disclosure have been described in detail above, the present disclosure is not limited to the embodiments, and various modifications and alternations can be made within the scope of the gist of the present disclosure described in the claims.

Examples

Hereinafter, examples of the present disclosure will be described. The present disclosure is not limited to the following examples.

A positive electrode mixture slurry was prepared using lithium-manganese-nickel-cobalt oxide ($LiNi_{0.6}Mn_{0.2}Co_{0.2}O_2$) as a positive electrode active material, a sulfide solid electrolyte material as a solid electrolyte, and carbon black as a conductive aid, and die-coated to form a first active material layer. In addition, a solid electrolyte slurry was prepared using a sulfide solid electrolyte material having a particle size of less than 1 μm and applied to the first active material layer to form a second solid electrolyte layer. A positive electrode was pressed under a condition of 980 Mpa, the porosity of the first active material layer was adjusted to 5% or less, and a positive electrode on which the second solid electrolyte layer was formed was prepared.

A negative electrode mixture slurry was prepared using natural graphite as a negative electrode active material and a sulfide solid electrolyte material as a solid electrolyte and die-coated to form a second active material layer. In addition, a solid electrolyte slurry was prepared using a sulfide solid electrolyte material and applied to the second active material layer to form a third solid electrolyte layer. A negative electrode was pressed under a condition of 980 Mpa, the porosity of the second active material layer was adjusted to 5% or less, and a negative electrode on which the third solid electrolyte layer was formed was prepared.

In addition, a first solid electrolyte layer was prepared using a sulfide solid electrolyte material and a PET nonwoven fabric.

When the positive electrode, the first solid electrolyte layer and the negative electrode are laminated in that order, the positive electrode and the negative electrode were subjected to tab welding and sealing fusion, and the laminate was pressed to produce a paired laminated cell.

Measurement and evaluation of the paired laminated cell obtained above were performed by the following methods.
(Filling Rate of Active Material Layer)

The porosity of the first active material layer and the second active material layer was measured. The porosity was determined by measuring the basis weight of the electrode, measuring the thickness from cross section observation under an electron microscope, determining a density from the volume calculated based on the basis weight and the thickness, and calculating a relative density from the density and a theoretical density of the electrode design, that is, a filling rate. Here, it was confirmed that the porosity of the first and second active material layers was almost the same value even if measured at different depth positions, and the filling rate did not change in the thickness direction.
(Charging/Discharging Characteristics)

Figure 9A:
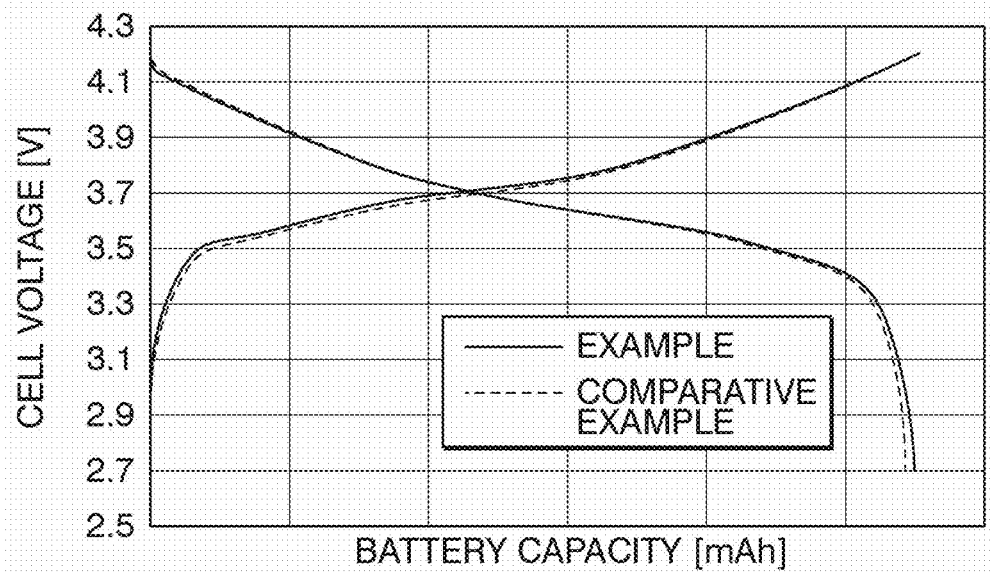
FIG. 9A is a graph showing charging/discharging characteristics of an example and a comparative example.

Charging/discharging characteristics of the paired laminated cell were measured under a condition of 25° C. In addition, as a comparative example, charging/discharging characteristics of the paired laminated cell obtained by the same method as in the example except that production was performed by batch pressing were measured. The results are shown in FIG. 9A.
(Resistance Characteristics)

The resistance of the paired laminated cell was measured under conditions of 25° C. and SOC 50%. In addition, as a comparative example, resistance characteristics of the paired laminated cell obtained by the same method as in the example except that production was performed by batch pressing were measured. The results are shown in FIG. 9B.

As shown in FIG. 9A, it was found that the paired laminated cell of the example exhibited the same charging/discharging characteristics as the paired laminated cell of the comparative example and had the same battery capacity as that of the comparative example.

Figure 9B:
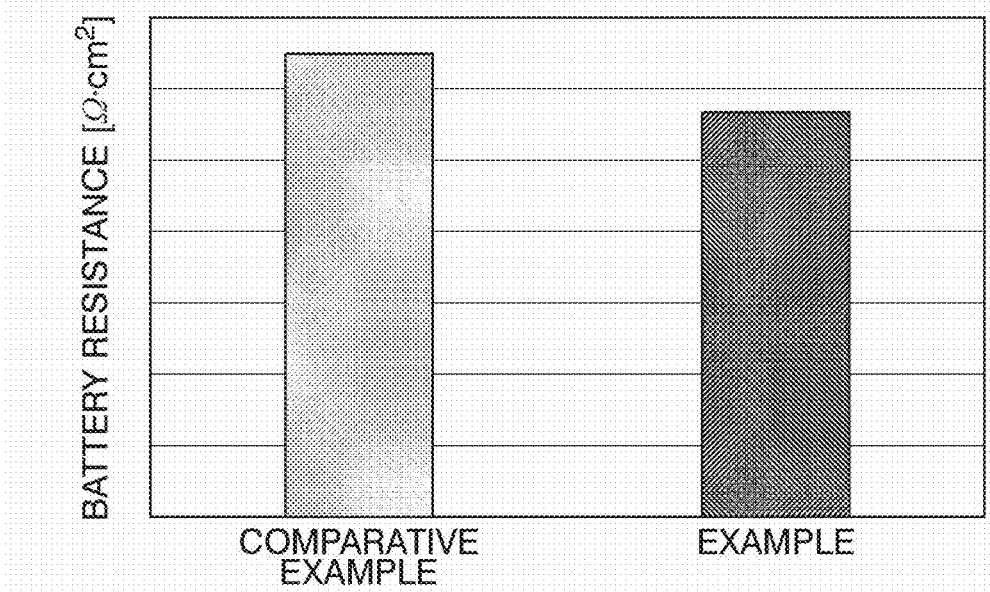
FIG. 9B is a graph showing resistance characteristics of an example and a comparative example.

In addition, as shown in FIG. 9B, it was found that the paired laminated cell of the example had a resistance about 13% smaller than that of the paired laminated cell of the comparative example.
(Solid Electrolyte Abundance Ratio)

Next, the influence of the solid electrolyte abundance ratio at the interface between the first active material layer and the second active material layer in contact with the first solid electrolyte layer on the battery characteristics was measured and evaluated as follows.

First, a paired laminated cell was produced in the same manner as above except that the solid electrolyte abundance ratio at 1 µm on the surface of the second active material layer was adjusted to 50%, 70%, 90%, and 100%. Here, the solid electrolyte abundance ratios of 50%, 70%, and 90% indicate a state in which the second solid electrolyte layer and the third solid electrolyte layer are not present on the first active material layer and the second active material layer, and the solid electrolyte abundance ratio of 100% indicates a state in which the second solid electrolyte layer and the third solid electrolyte layer are present on the first active material layer and the second active material layer.

The solid electrolyte abundance ratio in the first active material layer and the second active material layer was determined at a position with a depth of 1 µm from the surface layer of the first active material layer and the second active material layer, that is, the bonding part between the first solid electrolyte layer, the first active material layer, and the second active material layer. The solid electrolyte abundance ratio was measured by observing arbitrary cross sections of the first active material layer and the second active material layer under an electron microscope and performing image analysis.

In addition, the abundance ratio of the solid electrolyte layer in the second and third solid electrolyte layers was measured by the same method described above at a position with a depth of 1 µm from the surface layer of the second solid electrolyte layer and the third solid electrolyte layer, that is, the bonding part between the first solid electrolyte layer, the second solid electrolyte, and the third solid electrolyte layer. Here, it was confirmed that the abundance ratio of the solid electrolyte of the second and third solid electrolyte layers was 100% at different depth positions, and the abundance ratio did not change in the thickness direction. The results are shown in Table 1.
(Bondability)

According to a peeling test using an adhesive tape, the bondability between the first solid electrolyte layer and the first active material layer or the second solid electrolyte layer and the bondability between the first solid electrolyte layer and the second active material layer or the third solid electrolyte layer were evaluated. If it could not be clearly peeled off due to an adhesive tape, the bondability was very good "⊚," if it could not be peeled off until a certain degree of force was applied, the bondability was good "○," and if it could be easily peeled off, the bondability was poor "x." The results are shown in Table 1.
(Resistance Characteristics)

The resistance of the paired laminated cell was measured by the same method descried above. Compared with the example shown in FIG. 9B, if the resistance was the same as that of the example, it was "low," if the resistance was 10 to 20% higher, it was "medium," and if the resistance was 30% or more, it was "large." The results are shown in Table 1. The results are shown in Table 1.

TABLE 1

| | Abundance ratio of the solid electrolyte at a position with a depth of 1 µm from the surface of the first active material layer and the second active material layer in contact with the first solid electrolyte layer | | | |
|---|---|---|---|---|
| | 50% | 70% | 90% | 100% |
| Bondability | x | O | ⊚ | ⊚ |
| Resistance | High | Medium | Low | Low |

As shown in Table 1, it was found that, when the abundance ratio of the solid electrolyte on the surface of 1 µm of the first and second active material layers in contact with the first solid electrolyte layer was 70% or more, the bonding between the first solid electrolyte layer and the first and second active material layers was good or very good. In addition, it was found that the resistance was low when the abundance ratio was 70% or more. Particularly, it was found that, when the abundance ratio was 90% or more, the bonding between the first solid electrolyte layers was very good, and the resistance was very low. In addition, it was found that, when the second and third solid electrolyte layers in contact with the first solid electrolyte layer were present, if the abundance ratio of the solid electrolyte on the surface of 1 μm of the second and third solid electrolyte layers in contact with the first solid electrolyte layer was 100%, the bonding between the first solid electrolyte layer and the second and third solid electrolyte layers was very good, and the resistance was very low.

On the other hand, it was found that, when the abundance ratio of the solid electrolyte on the surface of 1 μm of the first and second active material layers in contact with the first solid electrolyte layer was 50%, the bonding between the first solid electrolyte layers was poor. In addition, it was found that the resistance was large when the abundance ratio was 50%.

While preferred embodiments of the invention have been described and illustrated above, it should be understood that these are exemplary of the invention and are not to be considered as limiting. Additions, omissions, substitutions, and other modifications can be made without departing from the spirit or scope of the present disclosure. Accordingly, the invention is not to be considered as being limited by the foregoing description, and is only limited by the scope of the appended claims.

What is claimed is:

1. An all-solid-state battery, comprising:
a positive electrode in which a first current collector layer and a first active material layer containing at least a solid electrolyte are laminated;
a negative electrode in which a second current collector layer and a second active material layer containing at least a solid electrolyte are laminated; and
a first solid electrolyte layer disposed between the first active material layer and the second active material layer,
wherein, in a direction perpendicular to a lamination direction, an area of the second active material layer in the negative electrode is larger than an area of the first active material layer in the positive electrode,
wherein, in a direction perpendicular to the lamination direction, an area of the first solid electrolyte layer is larger than an area of the first active material layer in the positive electrode, and
wherein a porosity $n1_{am}$ of the first active material layer is 5% or less,
the all-solid-state battery further comprising a second solid electrolyte layer positioned between the first active material layer and the first solid electrolyte layer,
wherein a porosity $n2_{se}$ of the second solid electrolyte layer is smaller than the porosity $n1_{se}$ of the first solid electrolyte layer, and
wherein the porosity $n1_{se}$ of the first solid electrolyte layer, the porosity $n1_{am}$ of the first active material layer and the porosity $n2_{se}$ of the second solid electrolyte layer satisfy the relationship of $n1_{se} > n1_{am} \geq n2_{se}$.

2. The all-solid-state battery according to claim 1, wherein the porosity $n1_{se}$ of the first solid electrolyte layer is 30% or less.

3. The all-solid-state battery according to claim 1, wherein the thickness of the second solid electrolyte layer is 7 μm or less, and
wherein the thickness of the first solid electrolyte layer is 5 μm or more and 15 μm or less.

4. The all-solid-state battery according to claim 1, wherein the porosity $n2_{am}$ of the second active material layer is 10% or less.

5. The all-solid-state battery according to claim 1, further comprising
a third solid electrolyte layer positioned between the second active material layer and the first solid electrolyte layer,
wherein the porosity $n3_{se}$ of the third solid electrolyte layer is smaller than the porosity $n1_{se}$ of the first solid electrolyte layer.

6. The all-solid-state battery according to claim 5, wherein the porosity $n3_{se}$ of the third solid electrolyte layer is 10% or less.

7. The all-solid-state battery according to claim 5, wherein the porosity $n1_{se}$ of the first solid electrolyte layer, the porosity $n2_{am}$ of the second active material layer, and the porosity $n3_{se}$ of the third solid electrolyte layer satisfy the relationship of $n1_{se} > n2_{am} \geq n3_{se}$.

8. The all-solid-state battery according to claim 5, wherein the thickness of the third solid electrolyte layer is 7 μm or less, and
wherein the thickness of the first solid electrolyte layer is 5 μm or more and 15 μm or less.

9. A method of producing an all-solid-state battery, comprising:
a process in which pressurizing is performed when a first current collector layer and a first active material layer containing at least a solid electrolyte are laminated, and a positive electrode is formed;
a process in which pressurizing is performed when a second current collector layer and a second active material layer which contains at least a solid electrolyte and has an area larger than an area of the first active material layer in a direction perpendicular to a lamination direction are laminated, and a negative electrode is formed, and
a process in which pressurizing is performed when the positive electrode, a first solid electrolyte layer having a larger area than the first active material layer in a direction perpendicular to the lamination direction, and the negative electrode are laminated in that order, and a laminate unit is formed,
wherein, in the process of forming the positive electrode, pressurizing is performed when a second solid electrolyte layer is additionally laminated on the first active material layer, and
wherein, in the process of forming the laminate unit, the second solid electrolyte layer and the first solid electrolyte layer are bonded,
wherein a porosity $n2_{se}$ of the second solid electrolyte layer is smaller than the porosity $n1_{se}$ of the first solid electrolyte layer, and
wherein the porosity $n1_{se}$ of the first solid electrolyte layer, the porosity $n1_{am}$ of the first active material layer and the porosity $n2_{se}$ of the second solid electrolyte layer satisfy the relationship of $n1_{se} > n1_{am} \geq n2_{se}$.

10. The method of producing an all-solid-state battery according to claim 9,
wherein a pressure P3 in the process of forming the laminate unit is lower than either a pressure P1 in the process of forming the positive electrode or a pressure P2 in the process of forming the negative electrode.

11. The method of producing an all-solid-state battery according to claim 10,
wherein the pressure P1 in the process of forming the positive electrode is 98 MPa or more and 980 MPa or less; and
wherein the pressure P3 in the process of forming the laminate unit is 0.1 MPa or more and 10 MPa or less.

12. The method of producing an all-solid-state battery according to claim 11,
    wherein, in the process of forming the negative electrode, pressurizing is performed when a third solid electrolyte layer is additionally laminated on the second active material layer, and
    wherein, in the process of forming the laminate unit, the third solid electrolyte layer and the first solid electrolyte layer are bonded.

13. The method of producing an all-solid-state battery according to claim 12,
    wherein, in the process of forming the negative electrode, the pressure P2 is 98 MPa or more and 980 MPa or less.

14. The method of producing an all-solid-state battery according to claim 9,
    wherein, in the process of forming the laminate unit, the unpressurized first solid electrolyte layer is disposed between the positive electrode and the negative electrode and pressurized.

15. The method of producing an all-solid-state battery according to claim 9,
    wherein, in the process of forming the laminate unit, the laminate unit is pressurized while heating.

16. The method of producing an all-solid-state battery according to claim 15,
    wherein, in the process of forming the laminate unit, a heating temperature is 80° C. or higher and 200° C. or lower.

* * * * *